US006366897B1

United States Patent
Means et al.

(10) Patent No.: US 6,366,897 B1
(45) Date of Patent: Apr. 2, 2002

(54) CORTRONIC NEURAL NETWORKS WITH DISTRIBUTED PROCESSING

(75) Inventors: Robert W. Means, Rancho Santa Fe; Richard Calmbach, San Diego, both of CA (US)

(73) Assignee: HNC Software, Inc., San Diego, CA (US)

(*) Notice: Subject to any disclaimer, the term of this patent is extended or adjusted under 35 U.S.C. 154(b) by 0 days.

(21) Appl. No.: 09/361,776

(22) Filed: Jul. 26, 1999

(51) Int. Cl.[7] ............................ G06F 15/18; G06G 7/00
(52) U.S. Cl. ............................ 706/27; 706/39; 706/4
(58) Field of Search ............................ 706/27, 39, 41

(56) References Cited

U.S. PATENT DOCUMENTS

| | | | |
|---|---|---|---|
| 4,760,604 A | 7/1988 | Cooper et al. | 382/155 |
| 4,897,811 A | 1/1990 | Scofield | 706/25 |
| 4,958,375 A | 9/1990 | Reilly et al. | 382/159 |
| 5,155,802 A | * 10/1992 | Muller et al. | 706/39 |
| 5,239,594 A | 8/1993 | Yoda | 382/158 |
| 5,276,772 A | 1/1994 | Wang et al. | 706/20 |
| 5,325,466 A | 6/1994 | Kornacker | 706/61 |
| 5,359,699 A | 10/1994 | Tong et al. | 706/20 |
| 5,524,175 A | * 6/1996 | Sato et al. | 706/41 |
| 5,577,169 A | 11/1996 | Prezioso | 706/52 |
| 5,638,491 A | 6/1997 | Moed | 706/20 |
| 5,822,741 A | 10/1998 | Fischthal | 706/16 |
| 5,920,852 A | * 7/1999 | Graupe | 706/26 |
| 6,049,793 A | 4/2000 | Tomita | 706/17 |
| 6,115,480 A | 9/2000 | Washizawa | 382/103 |

OTHER PUBLICATIONS

Henrigues et al "Context and Scale Influencing Through Unsupervised Neural Networks", IEEE Proceedings of Vth Brazilian Symposium on Neural Networks, Dec. 9–11, 1998.*

Behnke, S. "Hebbian Learning and Competition in the Neural Abstraction Pyramid", IEEE IJCNN, Jul. 10–16, 1999.*

Hecht–Nielsen, R., "Data Manifolds, Natural Coordinates, Replicator Neural Networks, and Optimal Source Coding," 1996 Annual Meeting of International Neural Network Society, San Diego, California, Sep. 15–18, 1996, pp. 1387–1391.

Hecht–Nielsen, R., "Spatiotemporal Pattern Segmentation by Expectation Feedback," International Joint Conference on Neural Networks, Washington, D.C., Jan. 15–19, 1990, pp. 40, vol. II.

Hecht–Nielsen, R., "Theory of the Backpropagation Neural Network," International Joint Conference on Neural Networks, Washington, D.C., Jun. 18–22, 1989, pp. I–593–I605.

Sarajedini, A., et al., "Conditional Probability Density Function Estimation With Sigmoidal Neural Networks," IEEE Transactions on Neural Networks, Mar. 1999, vol. 10, No. 2, pp. 213–238.

(List continued on next page.)

Primary Examiner—George B. Davis
(74) Attorney, Agent, or Firm—Fenwick & West LLP

(57) ABSTRACT

A cortronic neural network defines connections between neurons in a number of regions using target lists, which identify the output connections of each neuron and the connection strength. Neurons are preferably sparsely interconnected between regions. Training of connection weights employs a three stage process, which involves computation of the contribution to the input intensity of each neuron by every currently active neuron, a competition process that determines the next set of active neurons based on their current input intensity, and a weight adjustment process that updates and normalizes the connection weights based on which neurons won the competition process, and their connectivity with other winning neurons.

3 Claims, 3 Drawing Sheets

OTHER PUBLICATIONS

Wu, Yu–Jhih, et al., "A Supervised Learning Neural Network Coprocessor for Soft–Decision Maximum Likelihood Decoding," IEEE Transactions on Neural Networks, Jul. 1995, vol. 6, No. 4, 986–992.

Levitan et al, A Model of Lateralization and Asymmetries in Cortical Maps, IEEE IJCNN, Jul. 10–16, 1999, abstract and pp. 121 and 122.

Yu et al, Dynamic Learning Rate Optimization of the Backpropagation Algorithm, IEEE Transaction on Neural Networks, May 1995, abstract and pp. 669, 667 and 673–676.

Hecht–Nielsen, R., "A Theory of the Cerebral Cortex," Proceedings of the 1998 International Conference on Neural Information Processing, Kitakyushu, Japan, Oct. 21–23, 1998, pp. 1459–1464 (1–6).

Hecht–Nielsen, R., "A Theory of the Cerebral Cortex," The $5^{th}$ Int'l. Sym. of Bioelectronic and Molecular Electronic Devices and The $6^{th}$ Int'l. Conf. On Molecular Electronics and Biocomputing, Okinawa, Japan, Nov. 28–30, 1995, pp. 287–289.

Hecht, Nielsen, R., "Combinatorial Hypercompression," Proceedings of the ICNN, 1987, pp. 1–7.

Atiya, A.F., "An Unsupervised Learning Technique for Artifical Networks," *Neural Networks,* vol. 3, No. 6, 1990, pp. 707–711.

Baim, P.W., "A Method for Attribute Selection in Inductive Learning Systems," IEEE Transaction on Pattern Analysis and Machine Intelligence, vol. 10, No. 6, Nov. 1988, pp. 888–896.

Drucker, H., et al., "Boosting and Other Machine Learning Algorithms," Machine Learning: Proceedings of the $11^{th}$ International Conference, New Brunswick, NJ, Jul. 1994, pp. 53–61.

Fahlman, S., et al., "The Cascade–Correction Learning Architecture," *Advances in Neural Information Processing,* $2^{nd}$, Morgan Kaufmann, 1990, pp. 524–533.

Kan, W., et al., "A Probabilistic Logic Neuron Network for Associative Learning," IEEE First International Conference on Neural Networks, Jun. 1987, pp. 11–542–11–548.

Kohonen, T., et al., "LVQ–PAK: The Learning Vector Quantization Program Package," Version 2.1, Oct. 1992, prepared by LVQ Programming Team of Helsinki University of Technology, Lab. of Computer & Info Science.

Mangrulkar, S., "Artifical Neural Systems" Dec. 1990, ISA Transactions, vol. 29, No. 1, pp. 5–7.

Michalski, R.S., et al., "Learning from Observation: Conceptual Clustering," 1983, from *Machine Learning: An AI Approach,* Morgan Kaufmann, pp. 331–363.

Rojer, A., et al., "A Multiple–Map Model for Pattern Classification," *Neural Computation,* vol. 1, 1989, pp. 104–115.

Wenskay, D.L., "Neural Networks: A Prescription for Effective Protection," Aug. 1991, *The Computer Lawyer,* vol. 8, No. 8, pp. 12–23.

Zhang, B., et al., "Distributed Parallel Cooperative Problem–Solving with Voting and Election System of Neural Learning Networks," *Parallel Processing in Neural Systems & Computers,* Elsevier Science Publishers BV, Holland, 1990, pp. 513–516.

\* cited by examiner

RESTART DURING NETWORK TRAINING

CORTRONIC NEURAL NETWORKS WITH DISTRIBUTED PROCESSING

This invention was made with Government support under Contract No. N00014-98-C-0356, awarded by the United States Department of the Navy, Office of Naval Research. The Government has certain rights in this invention.

BACKGROUND

1. Field of Invention

The present invention relates to distributed processing architectures for neural networks.

2. Description of the Background Art

Artificial neural networks are computational systems that provide for distributed representation of information. Typically, a neural network comprises a number of layers of neurons (nodes), including an input layer, a number of hidden layers, and an output layer. Conventionally, all of the neurons in a given layer are fully interconnected with all of the neurons in the next layer. The connection between two neurons provides the output of one neuron as the input to the other. A neuron takes the sum of input connections, applies a transfer function to the summed input, and generates an output to the next layer of neurons. In a software implemented neural network, the neurons are represented by data structures in memory that store their identity, transfer function, and connections to other neurons.

Connections between neurons are weighted. The connections between layers of neurons are typically described by a matrix, W[I][J], where I indexes the neurons of the first layer and J indexes the neurons of the second layer, and where w[i][j] is the weight of the connection between the i'th neuron in the first layer and the j'th neuron in the second layer. This type of weight matrix is very convenient for fully connected neural networks because the identity of the neuron in each layer is just its index into the matrix.

This matrix approach may be used for fully or sparsely connected layers. A sparsely connected network has each neuron in a given layer connected to a relatively small percentage of the neurons in another layer. In that case most of the connection strengths are zero. However, for very large neural networks, the weight matrix occupies too much memory. For example, in a neural network with 9 layers, each having 12,500 neurons, and each layer sparsely connected (at a rate of 0.1%) to its neighbor with feed forward and feedback connections, there would only be 2.5 million connections, but a matrix approach would require 10 GBytes of memory to store the connection matrices for all of the layers.

Instead of this wasteful practice, the connections between neurons may be stored as a data structure that keeps the connection strengths in either target lists or source lists. For a source list, a data structure for each neuron would list all of the neurons that is it receives connections from (the sources) and the weight of each connection. Each of these lists could be in a simple vector structure. For a target list, a given neuron lists all the neurons it sends output data to and the weight of each of these connections. The source list is the standard method because it allows the straightforward calculation of the input intensity of each neuron as the sum of the vector of its connection strengths. On the other hand, the target list data structure allows no such simple calculation. To calculate the input intensity for a given neuron, one would have to search all other neurons for connections and, if one was found and it was active, then its connection strength would have to be accumulated. Because of this difficult and inefficient computation, the target list data structure has not generally been used.

Yet another problem with conventional neural networks is that they do not realistically model actual biological neurons in their behavior for controlling or limiting the amount of inputs they can accept or outputs that they can generate. As a result, conventional neural networks do not behave in a manner directly analogous to their real world counterparts.

SUMMARY OF THE INVENTION

The present invention overcomes the limitations of conventional neural network design by providing certain implementations of a new type of neural network architecture called a cortronic neural network. A cortronic neural network comprises a plurality of regions, each region having a plurality of neurons. In one embodiment, neurons in a given region are sparsely connected with neurons in any other region, including the same region. Thus, all of the neurons in a given region will have some connections with a small number of neurons in other regions, without being connected to all of the neurons in another region or the same region. The connections between neurons are represented as target lists, where each neuron is associated with a list of the target neurons to which it provides an input, and a weight for each of these input connections.

The training of a cortronic neural network is characterized by periodic restart competitions, instead of conventional backpropagation. A restart competition is a mechanism for calculating the intensity of inputs to all of the neurons in a region or regions, determining which neurons are "winners" that will now fire (produce a new output), and adjusting the weights between the winning neurons and their active targets.

In another aspect of the present invention, the connection weights of both the inputs to a neuron and its outputs to its targets are normalized periodically. Normalizing the strengths of the connections between neurons during learning is based on the biological fact that a real neuron can only drive a finite number of neurons due to its limited chemical and electrical outputs. This fact is usually ignored in conventional learning schemes that adjust weights, such as the backpropagation algorithm for a multi-layer perceptron. Similarly, a neuron has only a finite amount of chemicals that it distributes to its input connections for receiving input signals. This limit is also usually ignored in many neural networks.

In one embodiment, the operations of a cortronic neural network are distributed in a parallel processing system between an executive computer and a number of distributed computers. The executive computer manages the distributed computers, and orchestrates the restart competitions on the various computers. The distributed computers store one or more regions or portions of regions of the neural network in their local memories, and compute intensity values from the locally active neurons, sharing this information with the executive computer and other distributed computers in order to globally update intensity values across the entire network. The distributed computers also participate in computation of information that is used to renormalize the weights.

DETAILED DESCRIPTION

1. System and Software Architecture

Cortronic neural networks comprise regions of neurons that are connected to neurons in the same region and to other neurons in separate regions. Each connection has a connection strength that is also referred to as a connection weight. Each region of neurons is conceptually a rectangular array of neurons (height×width). The connections are conceptually grouped into bundles or fascicles that go from one region to another region or the same region. In a preferred embodiment, the connections between two regions are sparse. In one embodiment, each of the neurons in a first region is connected to a relatively small percentage of the neurons in the same or different region. A neuron can be connected to neurons in more than one region. The selection of which neurons are initially connected is preferably random, so long as it remains a sparse interconnectivity.

Figure 1:
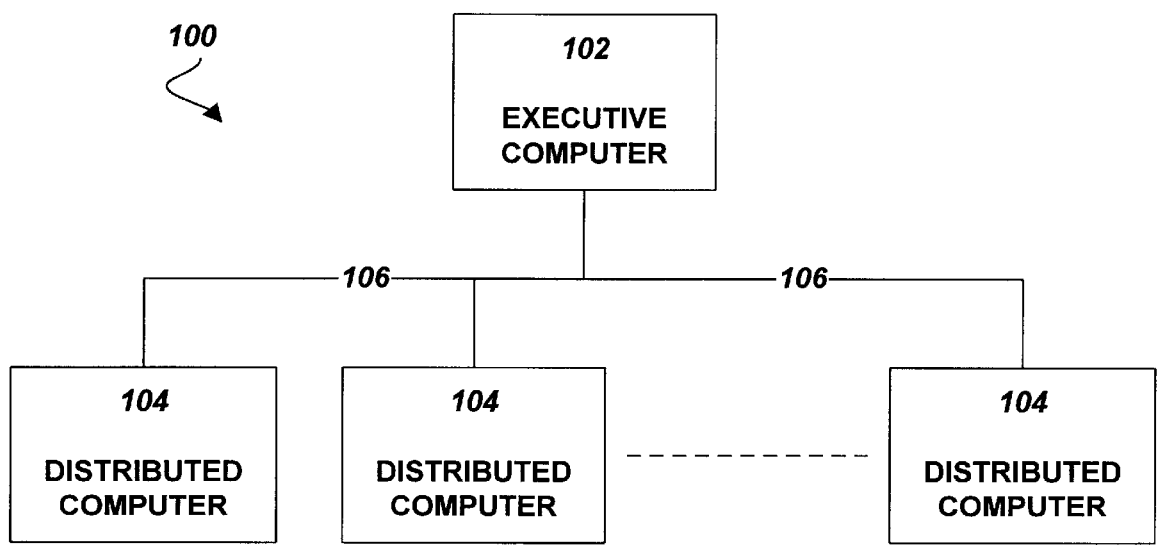
FIG. 1 is an illustration of a system in accordance with the present invention.

A cortronic neural network may be implemented on a computer system including an executive computer and a plurality of distributed computers. FIG. 1 illustrates a system in accordance with this embodiment of the present invention. System 100 includes an executive computer 102 and a plurality of distributed computers 104 communicatively coupled over a high speed network 106. Each computer 102, 104 includes a processor and a memory. The distributed computers 104 may be physically separate from each other, or may be configured as a number of parallel processors in a parallel processing arrangement in a single computer.

The following data structures may be used to implement a cortronic neural network in software within a system 100 as described. These data structures are described in the C language format so that the algorithms described in the following sections can be made explicit. In other embodiments, equivalent data structures may be used in C or in other languages or modeling environments. However, if other data structures are used, they should allow an implementation of the required processing that is at least as efficient as that described in all the algorithms below. For example, using pointers rather than the explicitly dimensioned variables (as described below) is almost certainly more efficient than using fixed dimension arrays. However, most data structures in this description are very simple and have been made so for clarity of algorithm design and readability.

Each neuron has a state, characterized by a state value of either 0 or 1. Neuron state and weight changes of the neuron's connections are episodic. That is, neurons change their state value and adjust their weights in response to commands that depend on their previous state and external inputs. Because of the dependency on prior state and weights, many variables will have both old and new versions. A double buffering scheme may be used to toggle between the two versions of a variable.

The distributed nature of the memory, however, adds complexity. Local and global variables in the context of the present invention have a meaning that is different from the standard C context. A variable is "local" if it has memory reserved for it only on one of the distributed computers 104. A variable is "global" if it exists on the executive computer 102. A distributed computer 104 may have local copies of variables that exist on the executive computer 102.

Throughout this description certain variable names have been reserved for counts of items, such as regions, connections and the like. These variables are:

| | |
|---|---|
| cNeurons | total number of neurons in all the regions |
| N | number of regions |
| M | number of connections per neuron |
| L | number of neurons assigned to a computer |
| R | number of regions assigned to a computer |
| NW[r] | number of winners in region r |
| P | total number of winners in all regions |
| Q | number of distributed computers |

With this set of nomenclature, the following data structures are used to define the cortronic neural network:

| | |
|---|---|
| tS32bitRegion_Height[N] | //Each region has a height |
| tS32bitRegion_Width[N] | //Each region has a width |
| tS32bitRegion_Count[N] | //Each region has a count of the //number of neurons = height*width |
| tS32bitcRegion | //count of the number of regions |

The total count of neurons in all regions is the sum of products of Region_Height[i] times Region_Width[i] for i=0 to N−1. cNeurons stores this value:

| | |
|---|---|
| tS32bit cNeurons | //Total count of all neurons |

Because any neuron in any region can be connected to any neuron in any region, each neuron has a unique global identity. The most straightforward way to assign this identity is to create a state vector Intensity[i] whose index i runs from 0 to cNeurons−1. The index, i, of the Intensity vector is the global ID of the neuron and the value of the i'th component of the vector is the state of the neuron. The state can be either 1 or 0, corresponding to on or off. In general, the states will have to toggle between an old and a new value as the cortronic neural network operates. This preferably involves the creation of paired variables, such as:

| | |
|---|---|
| tF32bit Intensity_New[cNeurons] | //Neuron state variable |
| tF32bit Intensity_Old[cNeurons] | //Neuron state variable |

In an alternative embodiment, the pairing of new and old variables may be handled by toggling between pointers to respective old and new values. However, for clarity, we will use different names in this description.

During initialization, all of the cortronic regions on the distributed computers 104 are defined in terms of the number of neurons per region, and their connectivity relationships with other regions. A Region_Map is created which identifies for each region, which distributed computer 104 stores the region, and which neurons are assigned to the region. A Region_Map may be understood as a set of partitions performed on the indexes of the Intensity vector. One implementation would be:

| | | |
|---|---|---|
| struct Partition { | | |
| tS32bit | Region_ID; | |
| tS32bit | start_index; | |
| tS32bit | end_index;} | |
| struct Partition | Region_Map[cRegion] | //Array of Partitions |

Start_index and end_index respectively identify the beginning and end of the partition of the Intensity vector assigned to a region.

Each distributed computer 104 is sent the Region_Map so that the distributed is computers know which regions are on which distributed computer. As stated above, each region of neurons is conceptually a rectangular array of neurons (height×width).

The executive computer 102 maintains a list of the active neurons, where a neuron is active when its state is 1. This active list is a global variable consisting of a set of global neuron IDs. An active neuron is also known as a "winner.". An implementation is:

| | |
|---|---|
| tS32bitP | //total number of active neurons over //all regions |
| tS32bitActive_List[P] | //a list of active neuron IDs |

Figure 2:
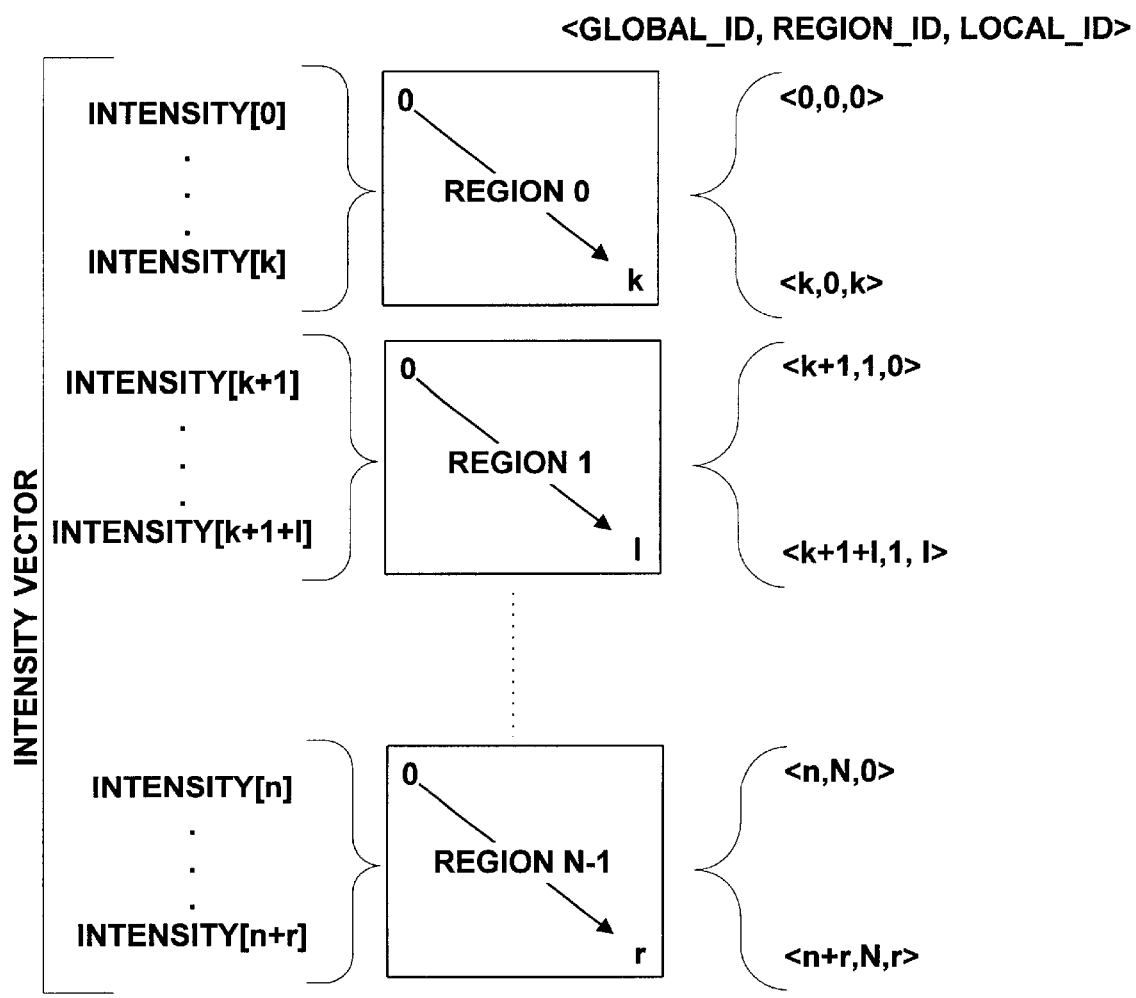
FIG. 2 is an illustration of the assignment of global IDs, and the mapping of global IDs to local IDs.

FIG. 2 illustrates the assignment of global IDs in relationship to the various regions in a cortronic neural network. Each region can have a different number of neurons. The number of neurons in region 0] is stored in Region_Count [0]. These neurons are assigned to have the first Region_Count[0] positions in the Intensity vector. The next region, region 1, has the next Region_Count[1] positions of the Intensity vector and so on. This implicit assignment of a position of the neuron in the Intensity vector assigns a global ID to each neuron that corresponds to the neuron's index in the Intensity vector. Other mechanisms for assigning a global ID may also be used.

As noted above, each neuron has a set of connections to other neurons. In a conventional backpropagation network, neurons in one layer are fully connected to neurons in another layer. This leads to a convenient way of representing the connections as a two dimensional matrix of weights. In cortronic neural networks, regions are typically sparsely connected and storing the entire matrix of weights would be inefficient. Furthermore, only a few neurons in a given region are active at the same time. Thus, only a few target lists have to be processed in order to compute the input intensities for all neurons.

The number of neurons times the number of weights per neuron can be quite large. Thus, one of the goals for the distributed network architecture of system 100 is that these weights are not routinely transferred over the network 106. During initialization of the cortronic neural network, complete regions of neurons will be assigned to the various distributed computers 104. In an alternative embodiment, a region may be spread over more than one of the distributed computers 104.

In one preferred embodiment, each distributed computer 104 has a local variable to hold the target lists containing the global IDs of the target neurons of each local neuron, and another local variable to hold the connection weights to the target neurons of each local neuron. Let each neuron have M targets, and hence M weights, one for each target. In one implementation, the local variables used for each distributed computer 104 and for each region assigned to the distributed computer are:

| | |
|---|---|
| tS32bit Target_List_New[L][M] | //Target list |
| tS32bit Target_List_Old[L][M] | //Target list |
| tF32bit Weight_New[L][M] | //Connection strength |
| tF32bit Weight_Old[L][M] | //Connection strength | where L is the number of local neurons assigned to this particular distributed computer 104 for this region and depends on the regions that were assigned to this particular computer. Each local neuron has an implicit local ID corresponding to its index in the Weight and Target_List arrays that runs from 0 to L−1. The region map maintained by the executive computer 102 maps the global neuron IDs to local neuron IDs based on which regions were assigned to which distributed computer 104.

Each row (value of m from 0 to M−1) of the target list represents a single neuron's connections and contains the global IDs of all the neurons that are connected to the output of that neuron. In one embodiment, the number of target neurons that each neuron has is the same number, M, though in other embodiments, each neuron may have different a number of target neurons.

Corresponding to each target list is a list of weights between each of the L local neurons and each of its M targets. For example, where the target list for the local neuron with local ID 10 may list global IDs for, say M=5 targets, such as {15, 61, 99, 163, 217}, then the weight list contains the weight between local ID 10 and each of these five targets, say {0.153, 0.943, 0.032, 0.654, 0.112}.

Each distributed computer 104 also has two temporary variables that are used in the calculation of neuron state information. The variables are called the Partial_Intensity and Intensity_Result and are vectors of length cNeurons. The Partial_Intensity vector is implicitly broken into Partial_Intensity sub-vectors that are transmitted from each distributed computer 104 to other distributed computers 104 for summation to get each distributed computer's local Intensity_Result information. This will be fully described in a later section. A normalization vector, Input_Norm is used to normalize the Intensity_Result vector.

| | |
|---|---|
| tF32bit Partial_Intensity[cNeurons] | //Local temp variable |
| tF32bit Intensity_Result[cNeurons] | //Local temp variable |
| tF32bit Input_Norm[cNeurons] | //normalization vector |

At a given time step of the cortronic processing cycle, there will be only a small number, NW, of active neurons in each region. These neurons will be the regional winners of a competition stage of processing. A set of arrays of different lengths is used to hold the winner lists for each region. These local variables are:

| | |
|---|---|
| tS32bitNW[R] | //Number of winners in a //Region |
| tS32bitLocal_Winner_List_0[NW[0]] | //Winning IDs of Reg. 0 |
| tS32bitLocal_Winner_List_1[NW[1]] | //Winning IDs of Reg. 1 |
| . | . |
| . | . |
| tS32bitLocal_Winner_List_R-1[NW[R-1]] | //Winning IDs of //Reg. R-1 |

The Intensity vector consists of cNeuron 32-bit integer values that are either 1 or 0. It may be sent from one computer to another in a very compressed manner since it can be transformed into a binary list of 1's and 0's of length cNeurons. This list contains both state and ID information. The position of the 1 in the list conveys the neuron ID. If the executive computer can compress this information and the distributed computer can unpack it in less time than it takes to send the uncompressed information, then there is a net benefit to compressing state and ID information before sending it.

2. Cortronic Commands

With the above described architecture, a cortronic neural network requires only a small number of fundamental operations to be effectively trained and operated to provide useful discrimination of input data. These commands are listed in Table 1. These commands can be combined in a script generated by a user that describes the operation of a cortronic neural network for a particular application.

TABLE 1

Cortronic Operations

| Operation | Description |
|---|---|
| Increment_Time(B) | $t \leftarrow t + 1$, B is Boolean that controls display process. |
| Restart(Region_ID, Learn, NW) | Intensity calculation, competition and weight adjustment. Learn is a flag that turns on learning, NW is the number of competition winners. |
| Impose_Pattern(X, Region_ID, P) | The pattern, X, is a list of global neuron IDs that are forced to be active this time step in a given region. P here is the percentage saturation. |
| External_Input(t,X) | An external function, supplied by a user, that generates a pattern at time, t. The external function returns the pattern as a set of global IDs in list variable X. |
| External_Output(t,X) | An external function, supplied by a user, that takes a pattern, X, and performs some function on it, or uses it for some operation, such as presenting a display to the user. |
| Get_Region_State(X, Region_ID) | Maps the active neurons from a given region into the state vector, X. This function is used to examine the state of the network. |
| Get_Time(t) | Returns the present time |
| Renormalize_Inputs( ) | Performs input renormalization on the weights and input intensity. |
| Renormalize_Outputs( ) | Performs output renormalization on the weights. |
| END | Used to terminate and clean up the simulation. |
| FOR | Used to loop over a set of operations. |
| IF . . . THEN . . . ELSE | Used for conditional execution. |
| Debug(t, "text") | At time t, "text" will be written to the debug log. |

The IF, END, and FOR commands are basic control flow and conditional commands familiar to those of skill in the art. The Get_Time and Increment_Time commands are used to determine and control the time cycles presented to the cortronic neural network during training and operation. Impose_Pattern, Get_Region_State, External_Input, and External_Output are data manipulation commands that allow for input to and output from the cortronic neural network. The next section describes the Restart and Renormalize commands in more detail.

3. Cortronic Algorithms Based on Target Lists

The connections between neurons in cortronic neural networks are normally very sparse. This section describes the basic cortronic algorithms assuming the use of target lists. Section 4 compares the computational requirements of these algorithms with the computational requirements for such algorithms based on conventional source lists.

3.1. Restart

This command includes three distinct operations that comprise the basics of the operation of a cortronic neural network: intensity calculation, neuron competition, and weight update. An algorithm for each one of these operations is described in this section.

The Restart command is used during both network training and operation. During training all three operations of the Restart command are used. Once the cortronic neural network is trained, then during operation Restart uses only the intensity calculation and competition operations. The Learn flag is used to select between the training and operation uses of Restart.

Figure 3:
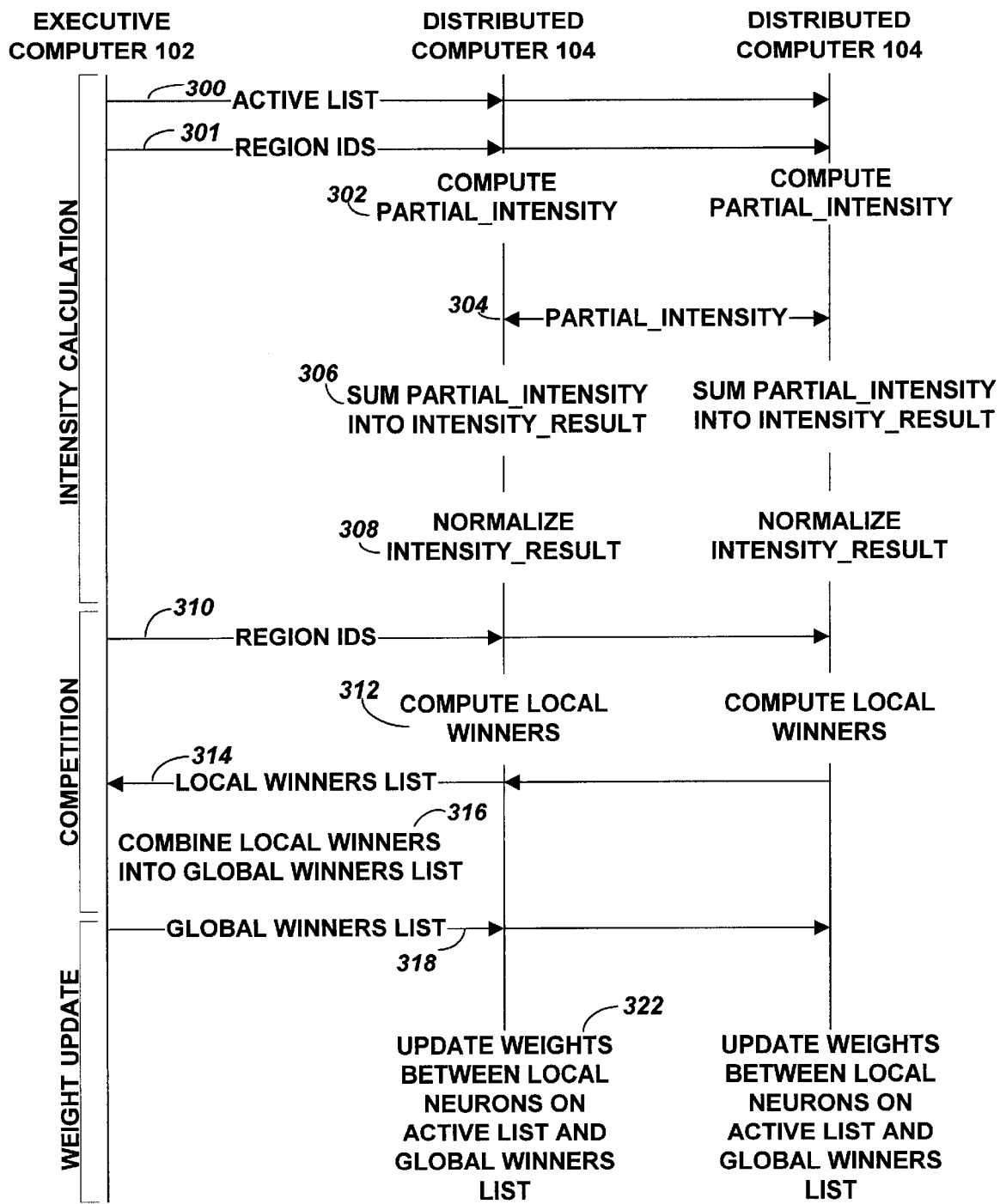
FIG. 3 is an event trace of the phases and operations during the restart operation.

FIG. 3 illustrates an event trace of the three phases of the Restart command during network training. Restart begins with the intensity calculation. The executive computer 102 transmits 300, 301 the Region IDs undergoing Restart and the Active_List to all of the distributed computers 104 Each distributed computer 104 that is responsible for a Region undergoing Restart computes 302 a Partial_Intensity vector, representing the contribution to the Intensity from each of its local neurons given the current state of its neurons and their connection weights to other neurons. The distributed computers 104 exchange 304 their Partial_Intensity vectors, and then sum 306 the received Partial_Intensity vectors into the Intensity_Result vector, which represents the intensity of all of the local neurons. Each distributed computer 104 then normalizes 308 its Intensity_Result vector.

At the beginning of Restart, each distributed computer 104 receives 301 from the executive computer 102 a list of region IDs of the regions that are undergoing Restart. In the competition phase, after the Intensity_result vector is computed, the distributed computers 104 compute 312 the local winners in each of the regions under competition, and transmit 314 lists of local winners back to the executive computer 102. The executive computer 102 combines 316 the various local winner lists and any imposed pattern into a new Active_List to be used in the next Restart cycle.

In the weight update phase, the executive computer 102 provides 318 the global winners list to all of the distributed computers 103. Each of the distributed computers 104 increases 322 the weights from the neurons in the current Active_List to the local winners that are also included in the global winners list. The reverse weights may also be increased, depending on the learning scheme.

The next section describes exemplary algorithms for performing these various operations.

3.1.1. Intensity Calculation Algorithm

Intensity calculation is, in general a non-local calculation. This calculation determines the current intensity of all neurons in all regions undergoing Restart, based on the currently active neurons. This information is then used in the neuron competition phase to determine the next set of active neurons.

Target neurons could be in any region. Because the connections between neurons are stored as target lists, it is necessary to accumulate the intensity contribution each active neuron makes to each of its targets. Further, because the targets may be in any of the regions, the intensity contributions from different distributed computers 104 must be combined. Thus, each distributed computer 104 calculates a Partial_Intensity vector for all the neurons in all the Restarted regions, summing the contributions from all of its locally active neurons. The Partial_Intensity vector is subdivided into sub-vectors that correspond to different regions and each sub-vector is sent to the distributed computer 104 that owns that region. The subvectors for a given region at each distributed computer 104 are added together to form an Intensity_Result subvector, thus, creating a set of local Intensity_Result sub-vectors. The Intensity_Result sub-vector is passed by each distributed computer 104 to the competition algorithm The use of the Input_Norm normalization vector will be explained in the section on renormalization.

In a preferred embodiment, the Intensity calculation may be implemented as follows:

The executive computer 102 performs the following operation to create the set of Intensity_Result sub-vectors:

1. Send each distributed computer 104 the Active_List and the Region IDs undergoing Restart.

The distributed computers 104 perform the following operations to update their local Partial_Intensity vector if they are responsible for one or more of the Regions with active neurons:

1. Receive the Active_List from the executive computer 102.
2. Clear the Partial_Intensity vector.
3. Traverse the Active_List by index (i), i=0 to P−1. For each neuron ID on the Active_List, (i), perform the following steps (A distributed computer 104 will know which portions of the Active_List correspond to it because the region map identifies the range of global IDs that correspond to its local neurons.)
   3.1 Global_ID=Active_List[i]. This obtains the global ID of the active neuron.
   3.2 If the Global_ID is a local neuron, map the Global_ID to an index, (k), into the local weight and target list arrays, Target_List_Old and Weight_Old. This step obtains the list of targets for the current neuron, and the list of connection weights.
   3.3 For every target of the current local neuron k on the Target_List, (j), j=0 to M−1, where M is the number of targets, update the Partial_Intensity vector with the weight of the connection between the current neuron and its target neuron:

Partial_Intensity[Target_List[k][j]]+=Weight_Old[k][j]

Here, Target_List[k][j] returns the global ID of the j'th target of local neuron k. This appropriately indexes into the Partial_Intensity vector, which is updated with the current (old) weight of the connection between local neuron k and its j'th target neuron.

Continue at 3.3, next target of current neuron k. Continue at 3.0, next neuron on Active_List.

4. Use the Region_Map to partition and send subvectors of the Partial_Intensity vector to the distributed computers 104 Each sub-vector is sent to the computer 104 that is responsible for that region.

Each distributed computer 104 that is responsible for one or more of the regions undergoing Restart performs the following operations:
   1. Receive Partial_Intensity subvectors from other distributed computers 104 that correspond to the local neurons.
   2. Sum all received Partial_Intensity sub-vectors to get an Intensity_Result subvector. The Intensity_Result subvector thus reflects the contribution of active neurons from all of the regions on all of the distributed computers 104.
   3. Multiply the Intensity_Result sub-vector by the Input_Norm sub-vector and store the result back into the Intensity_Result subvector. (See section 3.2 for the details of how the Input_Norm sub-vector is generated.)
   4. Invoke the competition algorithm locally, passing in the Intensity_Result sub-vector.

3.1.2. Competition Algorithm

Competition is performed among the neurons to determine which neurons are active in the next time step. Competition is limited to neurons within a single region. However, many regions can be competing internally during the same time step. A user command script determines the competing regions.

Generally, the competition process flows directly from the results of the intensity computation in each distributed computer. The number of winners for each region is NW[r]. Each distributed computer 104 selects the winning local neurons in each region. The winning local neurons have their output (state) value set to 1. The losers (non-winning neurons) have their output value set to 0.

The distributed computers 104 perform the following operations:
1. For each local Restarting region, r, in the set of received Restarting Region_IDs:
   1.1. Sort the Intensity_Result sub-vector values, and simultaneously perform the same permutations on a second vector that initially contains the global neuron IDs of the local neurons. After sorting is completed, the first M entries of this second vector are the global neuron IDs of the winners.
2. Send the global neuron IDs of the local winners from each region to the executive computer 102. This updates the executive computer 102 to have a complete listing of all local winners. As set forth above, the executive computer 102 combines the local winner lists with external pattern data to form the New_Winners_List which, together with the external pattern data, will become the new Active_List of active neurons for the next processing cycle.

3.1.3. Weight Update

Weight updates depend upon the learning law chosen by the system designer. The most common learning law is Hebbian learning, though other learning laws may be used in alternative embodiments. (In the following discussion of learning, "old winner neurons" are those in the Active_List and "new winner neurons" are those determined in the competition process of section 3.1.2 that is based on the input intensities resulting from inputs received from the old winners and possibly external sources.) A Hebbian learning law may be implemented as follows. Only the weights between an old winner neuron and a new winner neuron are allowed to change. If there is a connection between an old winner and a new winner, the strength of that connection is increased by a learning parameter, alpha. Typically, the weight from the old winner to the new winner is increased. In some cases, the inverse connection from the new winner to the old winner is also increased.

Implementing Hebbian learning in the context of a cortronic neural network requires that for each old winner, its target list is scanned to see if any of its target neurons are new winners. For each target neuron that is a new winner, the weight of the connection leading to it is increased. The algorithm in step 2 below describes a method of comparing two lists based on sorting the joined list. It takes on the order of $(M+P)\log(M+P)+M$ steps. An algorithm that makes use of a hash table is more efficient and would take on the order of $(M+P)$ steps, and may be used in an alternative embodiment.

Learning is done on a region by region basis and a fascicle by fascicle basis. A fascicle is a bundle of connections defined at initialization. All the connections in one fascicle begin in one single region and terminate in either the same region or another region. If a region has more than one fascicle, a fascicle flag or other method is used to limit learning to the specified fascicle. The following algorithm assumes that all fascicles in a given region are active at the same time. This is done only to simplify the algorithm description. If they are not all active, then the flags are examined to select the active connections for learning.

Each distributed computer 104 has a new temporary variable:

```
tS32bitConcatenated_List[M + P]    //a temporary list of
                                   //winning neuron IDs and a
                                   //row of the Target_List array
```

The executive computer 102 performs the following operations:
   1. Broadcast the list of new winners, New_Winners_List, to all the distributed computers 104 This is the global winner list of FIG. 3.

Each distributed computer 104 performs the following processing:
   1. Receive the New_Winners_List
   2. For each local region with old winners, create a Local_Active_List:

```
{
2.1  Traverse global IDs in the Local_Active_List for the
     current region. For each global ID:
     {
     2.1.1.  Map the global ID in the current region's
             Local_Active_List to an index k into the local
             weight and target list arrays of this region. This
             index k is the local ID of the active neuron.
     2.1.2.  Copy the target list of this active neuron into the
             Concatenated_List: For(j = 0; j < M; j++), where M
             is the number of targets.
             {
             Concatenated_List[j] = Target_List_Old[k][j]
             }
     2.1.3.  Append the New_Winners_List to the
             Concatenated_List. The result will be that any
             neuron that is both a new winner and a target will
             appear in the Concatenated_List twice. The
             connections leading to these duplicates are the
             ones that have to be strengthened. These duplicate
             instances are revealed by sorting.
             For(j = M; j < M + P; j++) //P is number of new
             winners
             {
                 p = j – M;         //p runs from 0 to P – 1
                 Concatenated_List[j] = Active_List[p];
             }
             Sort the values of the Concatenated_List of neuron
             IDs along with a second index vector whose initial
             elements are the indexes, 0, 1, . . . , M + P – 1.
     2.1.4   For each duplicate neuron ID in the
             Concatenated_List, increment the corresponding
             weight by a learning rate, alpha.
             Continue at 2.1 with next neuron in the
             Local_Active_List for this region
             }
Continue at 2 with next region with old winners.
}
```

The final innermost for loop (step 2.1.4) of the distributed computer processing may be further elaborated. When a sort of the concatenated list is made that also moves the index, two vectors are created. One is the sorted list of neuron IDs, the other is a list of indices of the original positions of the neuron IDs in the list. Both vectors are of length M+P where M is the number of connections in the Target_List_Old and P is the number of neurons in the New_Winners_List If two identical neuron IDs are found in the sorted list of neuron IDs, the corresponding two indices consist of one index whose value is less than M and one index whose value is greater than or equal to M. The index that is less than M is used to select the element of the weight vector, Weight_Old, that lo needs to be updated.

3.2. Renormalization

There are two types of normalization that must be done periodically, input normalization and output normalization. The normalization process is designed to emulate the fact that biological neurons can generate only a finite amount of the chemicals used to receive and transmit signals. Thus, both the sum of all the output connection strengths of a neuron and the sum of all the input connection strengths are limited. This fact of neurobiology does not appear to have been consistently applied before in the design of artificial neural networks. Some previous implementations of neural networks entirely ignore normalization. Others only have done output normalization or incorrectly performed both output and input normalization.

In a sparsely connected network, the number of connections that each neuron in a region has may differ. For simplicity of illustration, however, it is assumed that the number of connections in each target list is the same. This permits us to use standard matrix-vector notation A conventional weight matrix scaling approach leads to inconsistencies, as shown in the following:

Let W be a matrix of weights w[i][j] for the weights between the i'th and j'th neuron in two different layers. Each row of the matrix consists of a set of output weights for the i'th neuron. Scaling the output weights requires us to calculate a scale factor for each row of the matrix W:

$$\text{row\_scale}[i] = \sum_j w[i][j] \quad (1)$$

Then we can normalize each row of the matrix by the scale factor, row_scale[i], $$w[i][j] = w[i][j] \div \text{row\_scale}[i] \quad (2)$$

To scale the input weights, we now sum over all the inputs to get a scale factor for each column, $$\text{column\_scale}[j] = \sum_i w[i][j] \quad (3)$$

Then we normalize the columns of the weight matrix (i.e., input weights) by this factor, column_scale[j], $$w[i][j] = w[i][j] \div \text{column\_scale}[j] \quad (4)$$

The final step, (4), of normalizing the columns of the matrix, destroys the normalization of the rows.

One aspect of the present invention overcomes this problem with a scaling approach that maintains the independent scaling of rows and columns. Instead of actually scaling all the input weights, we use an input scale factor for each neuron that scales the sum of all the input weights (not the input weights themselves). With this scaling method, the input intensity itself can be scaled, without destroying the output scaling of the weights.

For output normalization, all the data is local (since the target list and connection weights for each local neuron are locally available) and the algorithm is straightforward. Equations (1) and (2) are used to normalize the output weights. All weights are assumed positive. A distributed computer 104 does the following when performing output normalization, Renormalize_Outputs( ):

1. Initialize the scale factor vector, scale[i], to zero for i=0, 1, . . . , L–1.

```
2.  For(i = 0; i < L; i++) // for each local neuron, add up all its weights.
    L is the number of local neurons.
    {
        For(j = 0; j < M; j++) // for each connection of a neuron
        {
            scale[i] += Weight_New[i][j] // add weight to sum
        }
    }
3.  For (i = 0; i < L; i++) // for each local neuron, divide its weights by
    its scale factor.
    {
        for(j = 0; j < M; j++) // for each connection of a neuron
        {
            Weight_New[i][j] = Weight_New[i][j] / scale[i]
        }
    }
```

The result of this scaling is that each output connection weight has the same relative strength as prior to scaling, while limiting the sum of the output weights appropriately mimics the biological neuron's limited production of neurotransmitters during propagation of output signals.

Input normalization, on the other hand, is done implicitly by maintaining an input normalization constant for each neuron. One algorithm for Renormalize_Inputs( ) is as follows:

1. Initialize the Partial_Intensity vector to zero.

---

2. In each distributed computer, a Partial_Intensity vector is computed by the following:
```
for(i = 0; i < L; i++)      //for each local neuron
{
    for(j = 0; j <M; j++)    //for each connection
    {
        Partial_Intensity[Target_List_Old[i][j]] +=
        Weight_Old[i][j]
    }
}
```

---

Unlike the previous calculation of the Partial_Intensity in section 3.1.1, this calculation gets contributions from all local neurons, not just the active ones.

3. Using the Region_Map, partition and send sub-vectors of the Partial_Intensity vector to each of the distributed computers 104. Each sub-vector is sent to the computer that is responsible for that region.
4. Receive Partial_Intensity sub-vectors from other distributed computers that correspond to the local neurons.
5. Sum all received Partial_Intensity sub-vectors to get the Input_Norm sub-vector that is used as described in section 3.1.1.

As noted above, the resulting Input_Norm sub-vector is used to normalize the Intensity_Result vector.

An example of this normalization procedure will illustrate that the conventional method leads to mistakes in network evaluation. Let us consider five neurons in region 1 that are connected to five neurons in region 2 with the following weight matrix W1:

| | | | | |
|---|---|---|---|---|
| 0.066667 | 0.133333 | 0.2 | 0.266667 | 0.333333 |
| 0.15     | 0.175    | 0.2 | 0.225    | 0.25     |
| 0.169231 | 0.184615 | 0.2 | 0.215385 | 0.230769 |
| 0.177778 | 0.188889 | 0.2 | 0.211111 | 0.222222 |
| 0.182609 | 0.191304 | 0.2 | 0.208696 | 0.217391 |

Note that this matrix, W1, is already row (output) normalized. Each row adds up to 1.0. If we now used the conventional method of normalizing each column by its sum, we will get to the inconsistencies shown below.

The sum of each column of W1 is the vector V1:

| | | | | |
|---|---|---|---|---|
| 0.746284 | 0.873142 | 1.0 | 1.126858 | 1.253716 |

The correct method uses the matrix W1 to calculate the intensity of the neurons in layer 2 followed by a renormalization of the input intensity by the vector V1. The incorrect method explicitly renormalizes the columns of matrix W1 with the vector V1 and leads to the incorrect weight matrix W2:

| | | | | |
|---|---|---|---|---|
| 0.089332 | 0.152705 | 0.2 | 0.236646 | 0.265876 |
| 0.200996 | 0.200426 | 0.2 | 0.19967  | 0.199407 |
| 0.226765 | 0.211438 | 0.2 | 0.191137 | 0.184068 |
| 0.238217 | 0.216332 | 0.2 | 0.187345 | 0.177251 |
| 0.244691 | 0.219099 | 0.2 | 0.185201 | 0.173398 |

Note that this matrix no longer has its outputs normalized, that is, the sum of each row is not equal to 1.0 and the output normalization is thus destroyed. Let us further illustrate the problems with the incorrect method of normalization by examining an example of the results of learning on the two different weight matrices. Let the change in weights due to a learning process be represented by the following matrix.

| | | | | |
|---|---|---|---|---|
| 0   | 0.5 | 0   | 0   | 0 |
| 0.1 | 0   | 0.5 | 0   | 0 |
| 0.5 | 0   | 0   | 0   | 0 |
| 0   | 0   | 0   | 0.5 | 0 |
| 0   | 0   | 0   | 0   | 0 |

Adding the change in weights to W1 and performing row (output) normalization leads to the weight matrix W1':

| | | | | |
|---|---|---|---|---|
| 0.044444 | 0.422222 | 0.133333 | 0.177778 | 0.222222 |
| 0.15625  | 0.109375 | 0.4375   | 0.140625 | 0.15625  |
| 0.446154 | 0.123077 | 0.133333 | 0.14359  | 0.153846 |
| 0.118519 | 0.125926 | 0.133333 | 0.474074 | 0.148148 |
| 0.182609 | 0.191304 | 0.2      | 0.208696 | 0.217391 | and the implicit input (column) normalization vector V1':

| | | | | |
|---|---|---|---|---|
| 0.947976 | 0.971904 | 1.0375 | 1.144762 | 0.897858 |

Adding the change in weights to W2, performing both the row (output) normalization and the explicit column normalization leads to the incorrect weight matrix W2':

| | | | | |
|---|---|---|---|---|
| 0.054907 | 0.420909 | 0.133738 | 0.156246 | 0.256862 |
| 0.16698  | 0.116655 | 0.422476 | 0.118988 | 0.173876 |
| 0.426381 | 0.130147 | 0.127654 | 0.120457 | 0.169737 |
| 0.13923  | 0.132657 | 0.127171 | 0.431538 | 0.162834 |
| 0.212501 | 0.199632 | 0.188961 | 0.172771 | 0.236691 |

The results of evaluating the intensities of the neurons in region 2 now are very different for these two methods of normalization. For example, let the first three neurons be active in region 1. Adding the first three rows of the matrix W1' and normalizing the result by the vector V1' leads to the following correct intensities in region 2:

| | | | | |
|---|---|---|---|---|
| 0.682347 | 0.673599 | 0.678715 | 0.403571 | 0.592876 |

On the other hand, adding the first three rows of the matrix W2' (already fully normalized) leads to the following incorrect intensities in region 2:

| | | | | |
|---|---|---|---|---|
| 0.648268 | 0.667711 | 0.683867 | 0.395691 | 0.600475 |

Note that these two vectors for the intensities in region 2 are entirely different The identity of the largest component is not even the same.

Thus, the present invention does not destroy the output normalization like the more conventional method does and results can be strikingly different after the learning operation.

4. Target List and Source List Comparison

Source lists are often a good way of conceptualizing the connectivity between neurons, and thus are used in both the description and the implementation of artificial neural networks. However, Table 2 below shows that, computationally, they are not efficient for sparse connections between and within regions of cortronic neural networks.

Let cNeurons be the total number of neurons in the network, N be the number of regions (assume that all regions have the same number of neurons), M be the number of connections per neuron, P be the total number of winners (assume each region has the same number of winners), and Q be the number of distributed computers 104 For simplicity, all the regions are the same size, all regions are updated on every time step and all neurons have the same number of connections. The number of operations in a Sort of size N has been set at $N*\log_2(N)$. This is only approximately correct. Also, only the leading term is listed in Table 2.

more computational power than the target list algorithms of the present invention and that the primary significant difference is in the intensity calculation. This is true for all problem sizes since the ratio of these two terms is the ratio of the total number of neurons in a region to the number of winning neurons in a region. The communication costs are the same for both target list and source list formulations. It is also important to note that the renormalization operation need not be done every time step so that the renormalization process is not necessarily the overall dominant computation step for the target list algorithms.

We claim:

1. A distributed artificial neural network system, comprising:

a plurality of distributed computers, each distributed computer storing in memory,
at least one region of an artificial neural network, each region containing a plurality of the neurons, each neuron associated with a list of target neurons to which the neuron has an output connection, the output connection having a connection weight, and wherein for at least one region on a distributed computer, the neurons in the region being connected

TABLE 2

Distributed Computer Operation Counts per Time Step

| Function | Target List Arithmetic Operation Count | Target List Data Transfer Count | Source List Arithmetic Operation Count | Source List Data Transfer Count |
|---|---|---|---|---|
| Intensity Calculation | $\frac{P}{Q}*M$ | cNeurons | $\frac{cNeurons}{Q}*M*\log_2(M)$ | cNeurons |
| Competition | $\frac{cNeurons}{Q}*\log_2\left(\frac{cNeurons}{Q}\right)$ | cNeurons $\frac{cNeurons}{Q}$ | $\frac{cNeurons}{Q}*\log_2\left(\frac{cNeurons}{Q}\right)$ | $2*\frac{cNeurons}{Q}$ |
| Weight Update | $\frac{P}{Q}*M*\log_2(M)$ | $\frac{P}{Q}$ | $\frac{P}{Q}*M*\log_2(M)$ | $\frac{P}{Q}$ |
| Renormalization | $\frac{cNeurons}{Q}*M*3$ | cNeurons | $\frac{cNeurons}{Q}*M*3$ | cNeurons |

Note that the term 1/Q is a common factor in both the source and the target list operation count columns. Thus, the parallel architecture of the present invention scales nicely, and allows for efficient implementation of large scale cortronic neural networks.

For numbers typical of a moderately sized problem, e.g. N=8, Q=4, cNeurons=100,000, K=7,000, and P=800 the formulas in Table 2 translate into the approximate numbers given in Table 3.

TABLE 3

Typical Distributed Computer Operation Counts per Time Step

| Function | Target List Arithmetic Operation Count | Target List Data Transfer Count | Source List Arithmetic Operation Count | Source List Data Transfer Count |
|---|---|---|---|---|
| Intensity Calculation | 1,400,000 | 100,000 | 2,275,000,000 | 100,000 |
| Competition | 350,000 | 25,000 | 350,000 | 50,000 |
| Weight Update | 18,200,000 | 200 | 18,200,000 | 200 |
| Renormalization | 525,000,000 | 100,000 | 525,000,000 | 100,000 |

It is clear from Table 3 that an implementation using source list algorithms would require orders of magnitude to substantially less than all of the neurons in another region or the same region;

an intensity calculation process, executed by the distributed computer, that determines an intensity of inputs to each neuron from the connection weights of the output connections of other neurons for which the neuron is a target neuron;

a competition calculation process, executed by the distributed computer, that determines a subset of the neurons that are active neurons as a function of an intensity of inputs at each neuron; and a renormalization calculation process, executed by the distributed computer, that normalizes the connection weights of the output connections of a neuron to its target neurons by a scaling factor derived from the sum of the connection weights of the output connections, and that normalizes the input intensity of each neuron by a scaling factor derived from the sum of input connection weights of connections from other neurons.

2. The artificial neural network system of claim 1, wherein the intensity calculation process on each distributed computer determines the intensity of inputs to each neuron from the weights that each neuron has to each of its target neurons by:

accumulating for each neuron, the weights of connections that local neurons on the distributed computer have to the neuron;

providing the accumulated weights to each of the other distributed computers;

receiving the accumulated weights computed by other distributed computers; and combining the received accumulated weights.

3. A computer system for operating a distributed artificial neural network, comprising:

an executive computer storing a region map defining a plurality of regions, each region including a plurality of neurons, and mapping a global identifier of each neuron to a local identifier of the neuron in a region; and a plurality of distributed computers communicatively coupled to the executive computer and to each other, each distributed computer storing the neurons of one region or portion thereof, each neuron associated with a list of target neurons, with each target neuron receiving an output from the neuron, the output having a connection weight, wherein the target neuron is in the same region as the neuron, or in a different region; each distributed computer further comprising: an intensity calculation process that determines an intensity of inputs to each neuron from the connection weights of the output connections of other neurons for which the neuron is a target neuron;

a competition calculation process that determines a subset of the neurons that are active neurons as a function of an intensity of inputs at each neuron; and a renormalization calculation process that normalizes the connection weights of the output connections of a neuron to its target neurons by a scaling factor derived from the sum of the connection weights of the output connections, and that normalizes the input intensity of each neuron by a scaling factor derived from the sum of input connection weights of connections from other neurons.

* * * * *